Dec. 21, 1965  C. A. LEE ETAL  3,224,928
PAPERMAKING MACHINE USING A MOVING FELT THROUGH A PRESSURE
FORMING SLICE AND THE SAME FELT THROUGHOUT THE MACHINE
Filed Dec. 21, 1961  7 Sheets-Sheet 1
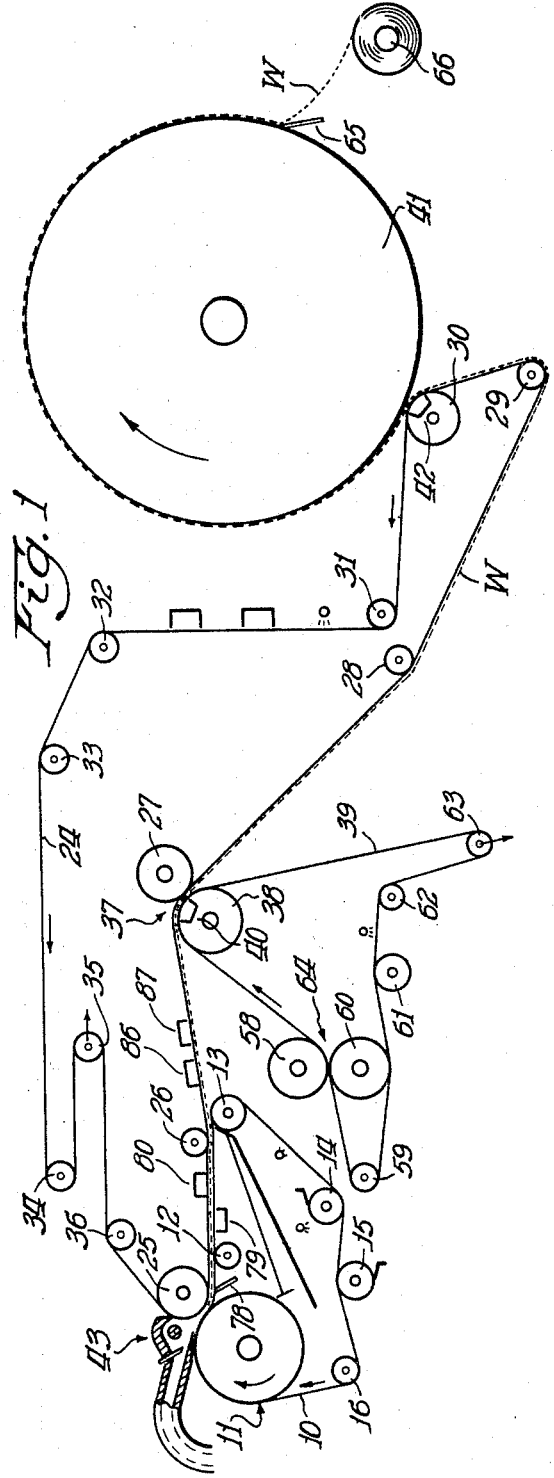
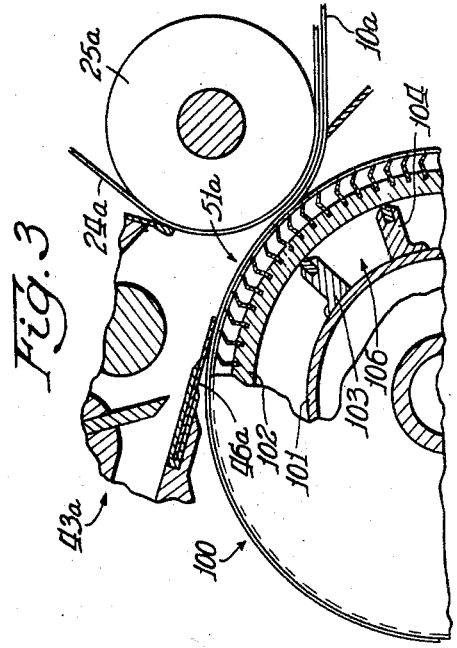
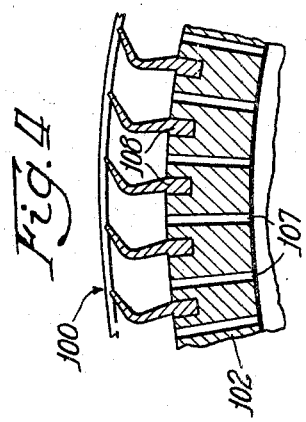

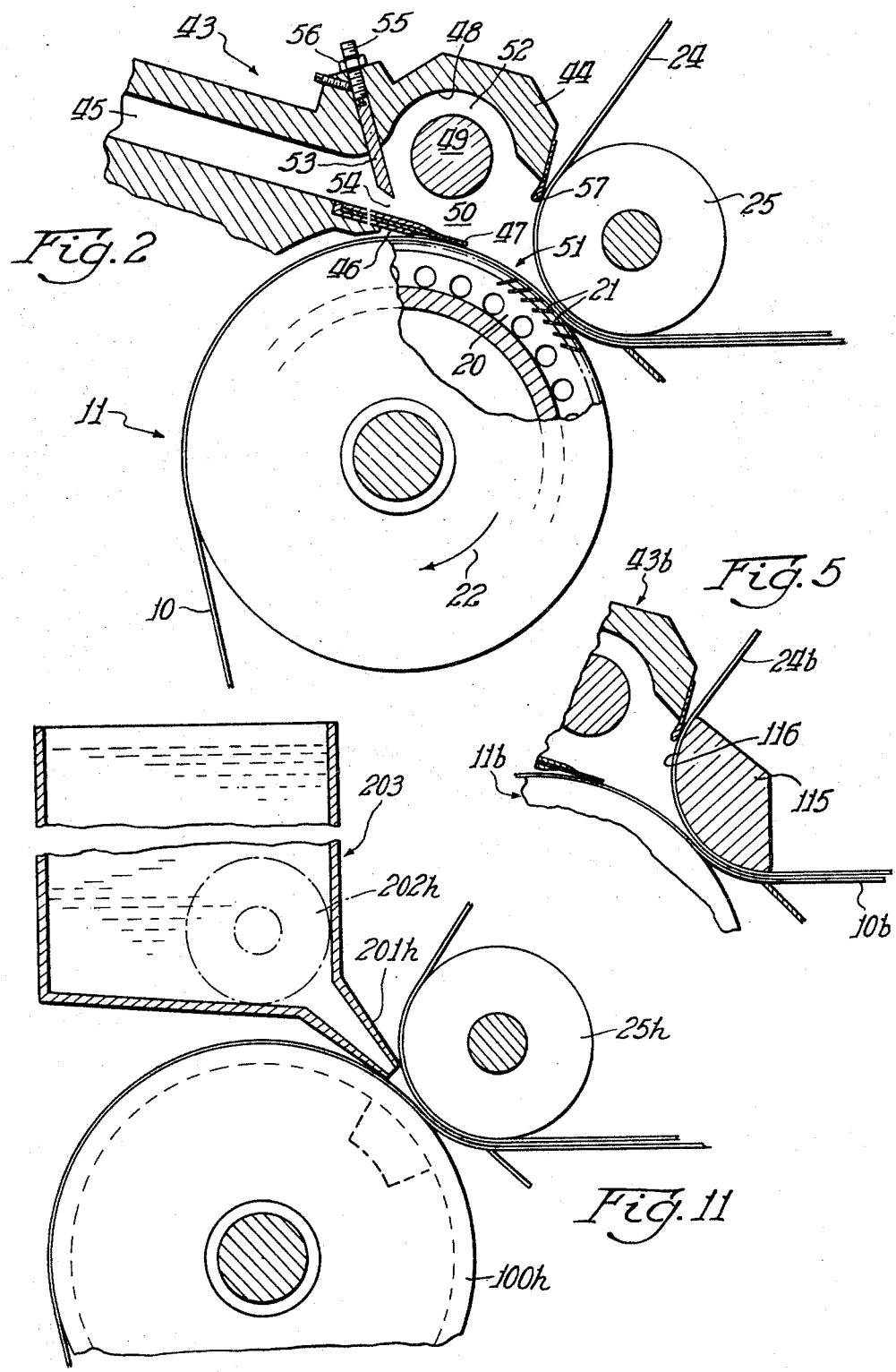

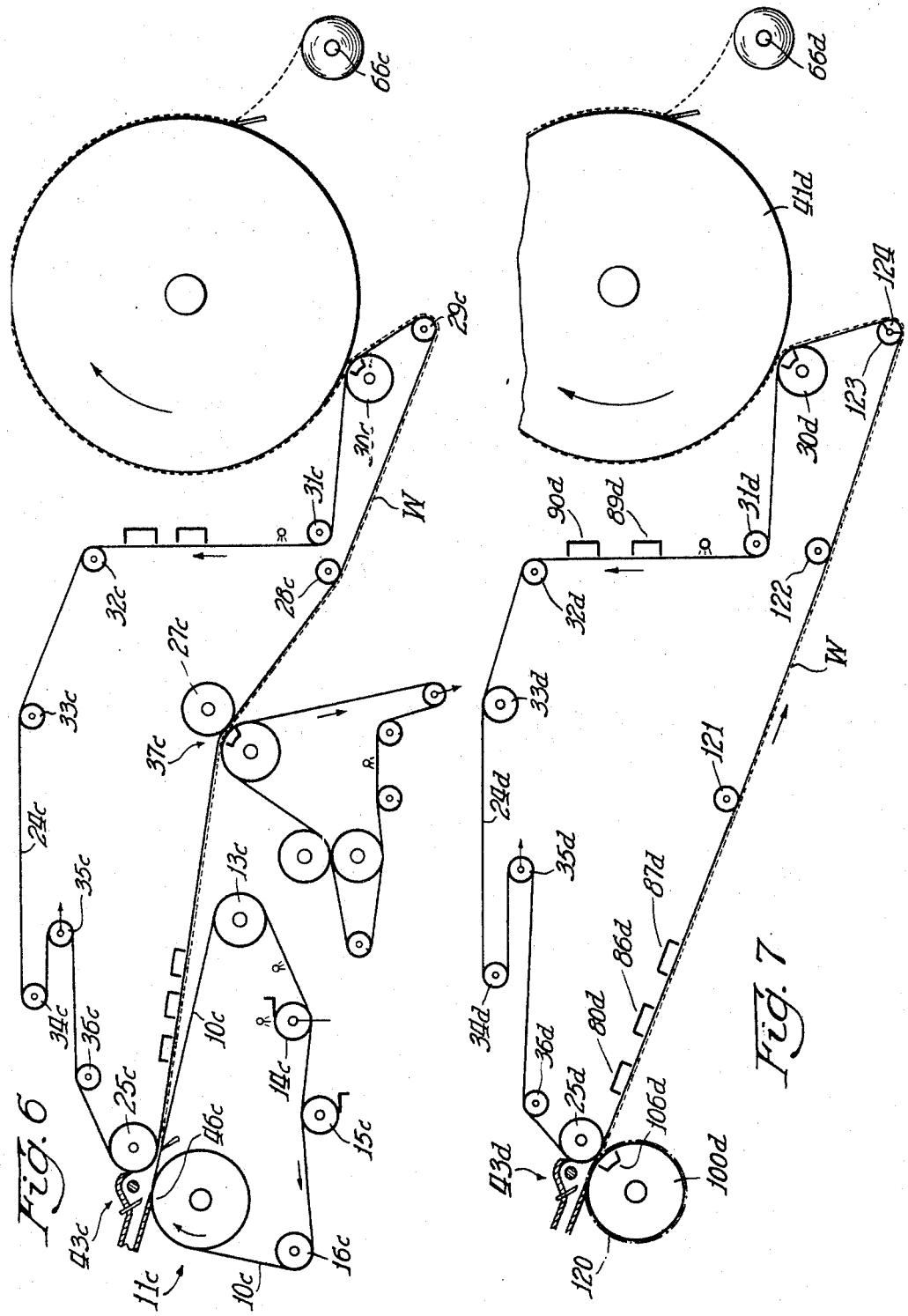

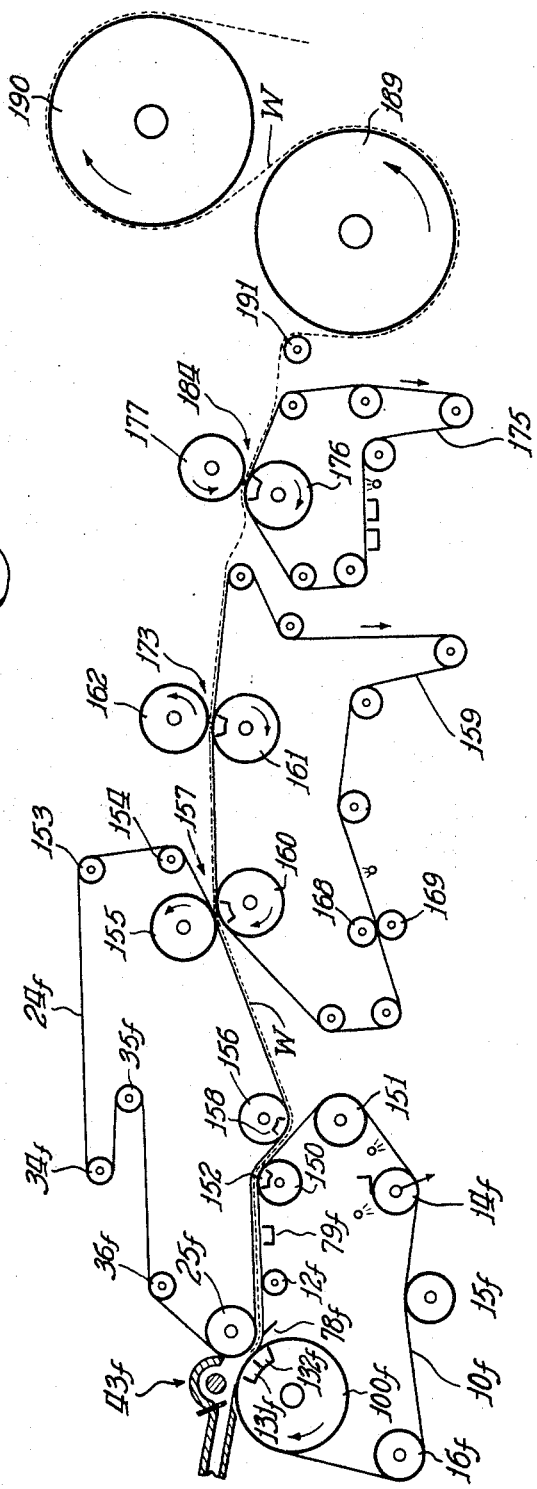

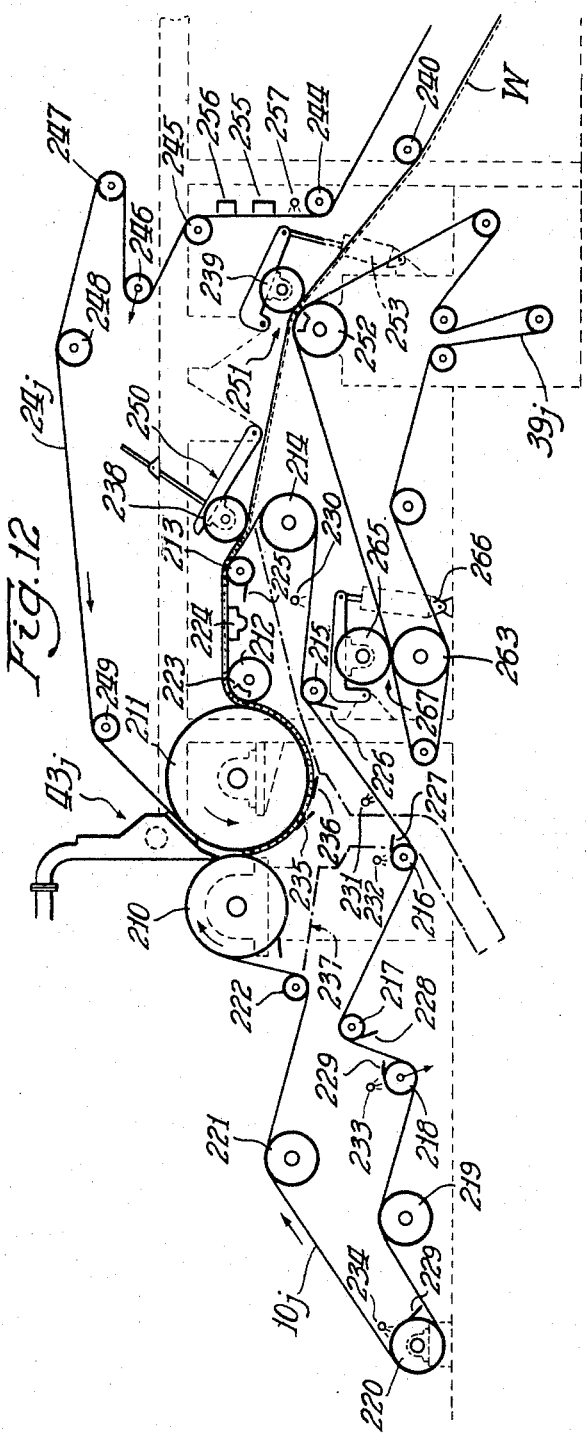

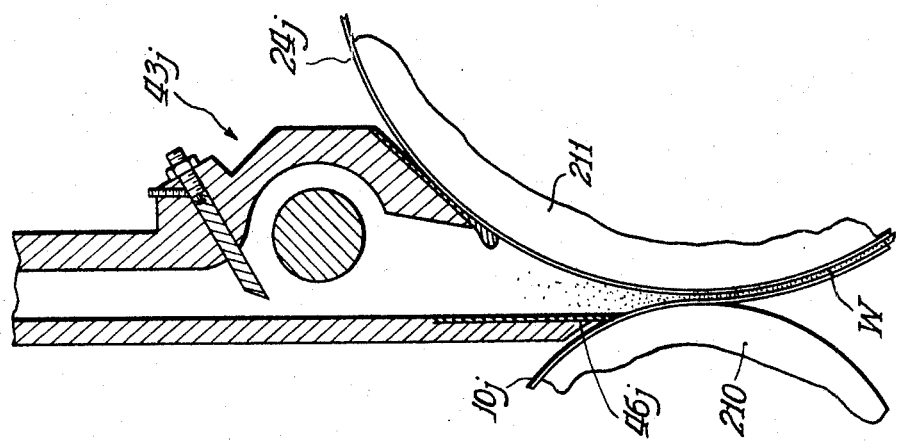
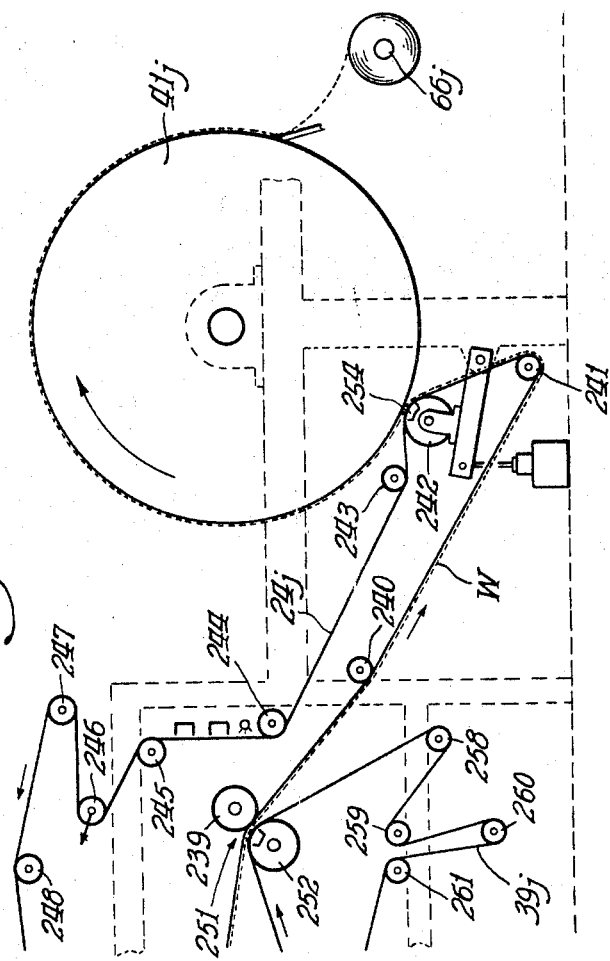

3,224,928
PAPERMAKING MACHINE USING A MOVING FELT THROUGH A PRESSURE FORMING SLICE AND THE SAME FELT THROUGHOUT THE MACHINE
Charles A. Lee, Knoxville, Tenn., and Charles A. Lamb, West Lafayette, Ind., assignors to Kimberly-Clark Corporation, Neenah, Wis., a corporation of Delaware
Filed Dec. 21, 1961, Ser. No. 161,058
20 Claims. (Cl. 162—214)

The present invention relates generally to papermaking machines and has particular relation to papermaking machines of the pressure forming type, i.e., to papermaking machines wherein the stock is supplied to a web forming region on a forming wire as a relatively high energy flowing stream which may be under considerable hydraulic pressure.

Prior to the pressure forming type of papermaking machine, it was the general practice in the operation of papermaking machines, particularly of the Fourdrinier type, to form the mat of fibers of which the paper web is composed by flowing onto the upper surface of the wire a layer of paper stock. Water drained from the paper stock in order to produce a coherent web or sheet which was capable of being couched off the end of the wire, and various arrangements including suction boxes, table rolls, etc., were disposed beneath the wire for increasing the drainage therethrough.

With the pressure forming types of papermaking machines, the stock is applied to a narrow section of the wire as a confined relatively high energy flowing stream, usually under substantial hydraulic pressure, so that a large proportion of the water in the stock mixture is forced through the wire in this region. It thus became possible to effect the drainage of a very large perecntage of the water from the web in a very short interval of time. In these prior machines, the high energy flowing stream was confined and the forming section of the wire was defined by a stationary slice which rested with substantial force on the forming wire so as to be effective in its stock confining function.

It was found with such prior machines that the basis weight of the web that could be made with them was limited, since stock fibers tended to hang up and collect on the stationary slices as thicker webs utilizing more fibers were formed. The stationary slices also had other disadvantages such as tending to card the fibers on the longitudinally extending knuckles of the forming wires so as to increase the MD/CD strength ratio of the web (the machine direction strength divided by the cross direction strength). Thus the resulting webs were quite strong longitudinally but relatively weak in the cross direction.

It is an object of the present invention to provide an improved slice arrangement, particularly for the pressure forming type of papermaking machine, which has a surface that moves along with the forming wire and which therefore does not tend to collect fibers even from heavier basis weight webs and does not act with a carding action with respect to the forming wire.

It is a further object of the invention to provide such a moving slice construction which includes a fabric travelling over a slice defining member, such as a stationary shoe or turning roll, with the fabric being chosen so that it absorbs water well, it releases water easily under pressure and it is relatively dense with respect to the forming wire so that it may be used to pick the formed web off of the wire and so that the fabric may be utilized in connection with a press for effective dewatering of the web.

Briefly, preferred forms of the invention include a relatively dense fabric, such as a papermaker's felt, travelling over a rotating slice roll to define a web forming region on a forming wire, with the machine including a press through which the felt carrying the formed web on the surface thereof is moved for an effective dewatering of the web prior to drying.

The invention consists of the novel methods, constructions, arrangements and devices to be hereinafter described and claimed for carrying out the above stated objects, and such other objects, as will be apparent from the following description of preferred forms of the invention, illustrated with reference to the accompanying drawings, wherein:

FIG. 1 is a schematic illustration of a paper-making machine embodying the principles of the invention and including an inlet for paper stock slurry discharging between an open breast roll carrying a web forming fabric and a slice roll also carrying a fabric;

FIG. 2 is a longitudinal sectional view on an enlarged scale of the stock inlet discharging between the breast roll and slice roll with part of the breast roll being cut away for illustrating its internal construction;

FIG. 3 is a view similar to FIG. 2 illustrating a modified construction utilizing a suction type of breast roll in lieu of the open type breast roll;

FIG. 4 is a partial sectional view of the suction breast roll taken on an enlarged scale;

FIG. 5 is a fragmentary longitudinal sectional view of a modified inlet assembly utilizing a stationary shoe in place of the slice roll;

FIGS. 6 and 7 are diagrammatic views of modified types of papermaking machines with which the inlet and roll assemblies may be used;

FIG. 9 is a schematic illustration of a papermaking machine which embodies the principles of the invention and which is particularly suitable for making heavier weights of webs;

FIGS. 10 and 11 are longitudinal sectional views of different types of inlets that may be used with the papermaking machines illustrated in the preceding figures and particularly in connection with the machine illustrated in FIG. 9;

Figure 10:
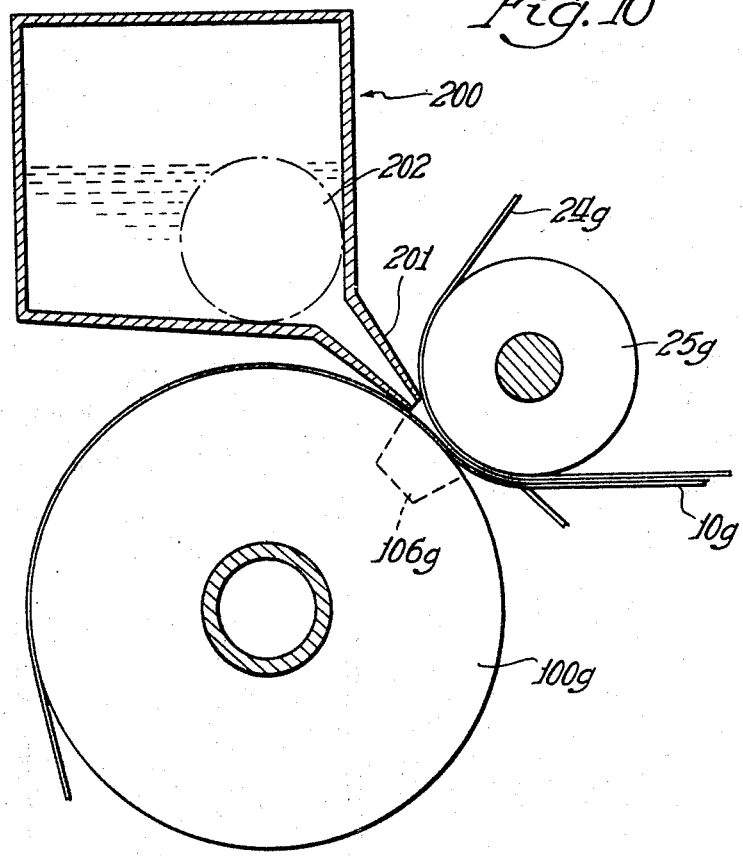

FIGS. 12 and 12A taken together are a schematic illustration of another embodiment of papermaking machine embodying the principles of the invention and including a stock inlet discharging between a slice roll and a breast roll which have centers in the same horizontal plane; and, FIG. 13 is a longitudinal sectional view on an enlarged scale of the stock inlet of the FIG. 12 machine.

Like characters of reference designate like parts in the several views.

Referring now to FIG. 1 of the drawings, the embodiment of the invention therein illustrated may be seen to comprise a loop of web forming fabric 10 which is disposed about rolls 11, 12, 13, 14, 15 and 16. The fabric 10 is a conventional paper web forming fabric for use in Fourdrinier machines made up of interwoven warp and shute strands for providing drainage openings therebetween through which water may drain from dilute paper stock applied on the fabric. The strands may be either metal or may be of synthetic material in accordance with well known practice. The roll 11, which is relatively large in diameter in comparison with the other rolls, may be termed a breast roll; the roll 12 is a conventional table roll having both ends fixed; and the roll 13 is on an end of the loop opposite the breast roll 11 having the position of a conventional couch roll. The roll 14 may be used as a stretch roll with suitable conventional mechanism (not shown) for simultaneously adjustably moving both ends of the roll for maintaining the fabric 10 taut about the rolls. The roll 15 is a conventional guide roll having one end fixed and the other movable, and any suitable conventional apparatus (not shown) may be connected with the movable end of the roll 15 so that the roll 15 functions to maintain the fabric loop travelling in substantially the same path about the rolls supporting the fabric. The roll 16 is a conventional turning roll for the fabric 10 having both ends of the roll fixed. One or more of the fabric supporting rolls, such as the breast roll 11, may be driven for the purpose of driving the fabric 10 so that its upper pass between the rolls 11 and 13 moves toward the latter roll.

The breast roll 11 may be of an open type and may comprise a plurality of annular rings 20 receiving vanes 21 that extend longitudinally of the roll and at angles, such as 45°, with respect to radii of the roll, so that the outer edges of the vanes lead in the direction of rotation of the roll indicated by the arrow 22 (see FIG. 2).

An upper loop of fabric 24 is disposed about rolls 25, 26, 27, 28, 29, 30, 31, 32, 33, 34, 35 and 36. The fabric 24, although it may be of a type similar to the fabric 10, is preferably one that absorbs water to a greater extent and releases water more easily than does the usual water draining paper web forming fabric. The fabric 24 may, for example, well be a conventional papermaker's felt, the attributes of which will be more particularly described hereinafter. The roll 25 is a solid roll and has a nip with the breast roll 11, preferably with a slight clearance as will be hereinafter described, and may be termed a slice roll. The rolls 26 and 25 have a lower pass of the fabric 24 extending between them, and the roll 25 depresses the fabric 10 adjacent the roll 11 so that an upper pass of the fabric 10 and the lower pass of the fabric 24 extend approximately horizontally and in substantial contact. The roll 27 constitutes one roll of a main press 37, which also includes another roll 38 having a nip with the roll 27. A bottom felt 39 extends between the rolls 27 and 38 along with the fabric 24. The roll 38 is a conventional main press roll having a perforated exterior shell, and a suction gland 40 is provided within the roll 38 in the vicinity of the nip between the rolls 27 and 38.

The rolls 28, 29, 31, 32, 34 and 36 are simple fabric turning rolls fixed on both ends. The roll 30 is a pressure roll having a pressure nip with a Yankee drier drum 41 and is of the conventional pressure roll type having a perforated external shell with a suction gland 42 within the roll 30. The roll 33 is a conventional guide roll having one end fixed and the other end movable under the control of any suitable control mechanism (not shown) for maintaining the fabric 24 travelling in a predetermined path about the rolls supporting the fabric. The roll 35 is a conventional stretch roll having both ends simultaneously adjustably movable by suitable adjusting mechanism (not shown) for maintaining the loop 24 taut about the rolls supporting the loop. One or more of the rolls supporting the fabric 24 is driven to thereby move the fabric in the direction indicated by the arrows. As will be hereinafter described more in detail, dilute paper stock is provided to the nip between the rolls 11 and 25, and a paper web W is formed on the fabric 10 and travels between the passes of the fabrics 10 and 24 between the rolls 25 and 26 and thereafter travels on the underside of the fabric 24, through the main press 37, and over the rolls 28, 29 and 30 to the drier 41.

A stock inlet 43 (see FIGS. 1 and 2) is provided for discharging paper stock directly into the nip between the rolls 11 and 25 and into the nip of the fabric loops 10 and 24 extending about these rolls. The inlet 43 comprises a housing 44 having a stock conduit 45 therein and carries a lip 46 comprising a rectangular strip of sheet metal 47 having its free edge adjacent the periphery of the roll 11 and the fabric 10 extending around this roll. The housing 44 is provided with a dome shaped cylindrical cavity 48 therein, and a cylindrical flow directing element 49 is located within the cavity 48 concentrically with the walls of the cavity. The element 49 is so positioned to provide a stock passageway 50 directly below the element 49 directly connecting the conduit 45 with a web forming region 51 on the roll 11, which is between the end of the lip 47 and the nip between the rolls 11 and 25. The element 49 also provides a stock recirculating passageway 52 between it and the walls of the cavity 48. An orifice plate 53 is disposed on the upstream side of the element 49 and provides a stock restricting orifice 54 between it and the lip 46. The plate 53 is adjustable and may for this purpose be provided with threaded studs 55 on its upper edge extending through the housing 44, so that the plate 53 may be raised or lowered by means of nuts 56 in threaded engagement with the studs 55. The inlet 43 is preferably sealed with respect to the rolls 11 and 25 and the fabrics 10 and 24 about the rolls. A seal 57 is provided for this purpose between the inlet 43 and the roll 25, and the lip 46 functions as a seal between the inlet 43 and the roll 11.

The bottom felt 39 is supported by rolls 58, 59, 60, 61, 62 and 63 in addition to the roll 38. The rolls 58 and 60 have a nip between them through which the felt 39 passes, and both of them are solid and a nip pressure is maintained between them, so that the rolls function as a wringer 64 for the felt.

The drum 41 is a conventional Yankee type drier to which steam under pressure is supplied for drying the paper web W. A doctor blade 65 is held in forceful contact with the external surface of the drier 41 by any suitable conventional mechanism, so that the blade is effective for the purpose of doctoring off the web W which is formed by the papermaking machine and is dried by the drier 41. Any suitable takeup and storing apparatus may be provided for the paper web W as it comes from the Yankee drier 41, such as a reel 66. The drum 41 is preferably directly driven from any suitable prime mover (not shown).

Conventional apparatus is provided for collecting so called "white water" draining through the forming fabric 10 from the web being formed on the fabric, adding fresh stock, and pumping the mixture of white water and fresh stock to the inlet 43.

Various appurtenances are used in connection with the fabrics and rolls of the machine, such as for cleaning them or for dewatering purposes. A doctor blade 78 is disposed beneath the slice roll 25 for downwardly directing water that is thrown from the breast roll 11, and vacuum boxes 79 and 80 are disposed above and below the passes of the fabrics 10 and 24 between the rolls 25 and 26 for dewatering the paper web between these passes of the fabrics. Vacuum boxes 86 and 87 are disposed above the fabric 24 in its pass between the rolls 26 and 27 for dewatering the fabric 24 and the web W carried by the fabric. In operation of the papermaking machine as so far described, a fiber water mixture is supplied to the stock inlet 43, and this mixture passes through the conduit 45, through the restricted orifice 54 beneath the plate 53 and through the passageway 50 onto the web forming region 51 of the fabric 10 between the end of the lip 46 and the nip between the rolls 25 and 11. There are a lower layer of stock within the inlet 43 that passes beneath the plate 53 and travels directly to the web forming region 51 and an upper layer of stock that recirculates within the cavity 48, and the stock is thus given turbulence and is mixed. The cavity 48 and orifice plate 53 have still another advantageous function in providing a desirable stock pressure gradient in the pressure forming region 51 which is low at the end of the lip 46 and increases abruptly to a maximum at the end of the region 51 in the vicinity of the nip between the rolls 11 and 25. The low pressure with which the stock is deposited on the fabric 10 at the upstream end of the forming region assures that the stock fibers do not adhere unduly to the fabric 10 to prevent the formed paper web from being ultimately separated from the fabric 10, and the relatively high pressure at the downstream end of the forming region assures that any relatively low density web areas are filled in with fibers to give uniformity to the resulting web.

The fabrics 10 and 24 are in motion as described above, with the fabrics moving from the rolls 11 and 25 toward the rolls 13 and 26, and the stock deposited on the web forming region 51 of the fabric 10 results in the paper web W. White water drains from the stock as it is initially deposited on the web forming region of the fabric 10 downwardly into the roll 11; and the vanes 21, which slant in the direction of rotation of roll 11, retain the white water within the roll 11 for a partial revolution of the roll, so that water is thrown out of the roll beneath the upper horizontal pass of the fabric 10 between the rolls 11 and 13. The doctor 78 aids in directing the water thrown out of the roll 11 downwardly, away from the wire 10. The inlet 43 in conjunction with the fabric 24 carried by the slice roll 25 thus functions as a pressure forming type of inlet in which an enclosed flow conduit is disposed to apply paper stock directly to a restricted area Fourdrinier wire region, the downstream end of which is defined and is substantially sealed with respect to the forming wire by a slice on the discharge end of the conduit. The slice in this case is formed by the rotating slice roll 25 together with the fabric 24 that extends around the roll 25 and travels with it and which substantially seals the inlet 43 with respect to the wire 10. In a machine of this type, during the web forming operation, the stock constitutes a confined relatively high energy flowing stream which is under substantial hydraulic pressure pressure so that a large portion of the water is thereby forced through the wire in the web forming region at a relatively high rate.

The resulting paper web W passes between the rolls 11 and 25 and into a sandwich formed by the horizontal passes of the fabrics 10 and 24 between the rolls 11 and 13 which are in substantial contact. White water continues to drain through the fabric 10 as the web moves with the fabrics 10 and 24 toward the rolls 13 and 26 to further dewater the web, and dewatering is increased by the action of the table roll 12 and the vacuum boxes 79 and 80 in accordance with well known principles of operation of such devices. The web W separates from the fabric 10 and remains on the lower side of the fabric 24 as the fabrics 10 and 24 separate at the roll 26, which thus functions as a pickup roll; and the web W passes with the fabrics 39 and 24 through the main press 37 formed by the rolls 27 and 28. The vacuum boxes 86 and 87 help in dewatering the fabric 24 and the web W carried on its lower surface as they pass on to the press 37.

The main press 37 wrings water from the fabric 24 and the web W as they pass through the press. Some of this water is drawn into the perforations of the roll 38 by the vacuum box 40 and this is thrown out after a partial revolution. The bottom felt 39 also absorbs some of the water which is removed from the felt by the wringer rolls 58 and 60 as the felt continues its travel, so that the felt 39 is presented at the main press 37 in a relatively dewatered condition. The bottom felt 39 together with the fabric 24 provide a thicker mat that may be compressed in the main press 37 than if only the single fabric 24 were used in the main press and thus greater dewatering action is had using the bottom felt than if it were omitted. In the action of the press 37, both the fabric 24 and the bottom felt 39 serve as porous media through which water can flow away from the nip between the rolls 27 and 38 in their wringing action.

The web W remains on the lower surface of the fabric 24 as it passes from the main press 37 over the rolls 28, 29 and 30. The pressure roll 42 presses the web W against the drier 41, and additional water is removed from the web W by the suction box 42 in the roll 30 by drawing water into the perforations of the roll 30 for subsequent discharge by centrifugal force after a partial revolution of the roll. The web W transfers from the fabric 24 on to the drum 41 at the nip between the pressure roll 30 and the drum and is dried by the drum as it rotates. The doctor blade 65 crepes the web from the drum, and the dried web is wound on to the reel 66.

As has been previously pointed out, the fabric 24 is preferably of quite a substantially different type than the fabric 10. The fabric 10 is a conventional Fourdrinier web forming fabric formed by interwoven warp and shute strands having a substantial spacing between them so as to provide drainage openings for draining the web being formed. These warp and shute strands customarily are relatively dense, being formed of solid metal wires or synthetic threads, and the fabric 10 thus is ideally suited both from a wear standpoint and from a stock draining standpoint for web forming use. Such a fabric, however, is not compressible to a great extent due to these dense strands, and it does not have the attributes of either absorbing water to a great extent or of releasing this water under pressure, inasmuch as interstices of the fabric retain the water. The fabric 24 is preferably one that has a relatively closed, uniform, matted formation. It should be resilient and compressible, and it should have the ability to absorb a substantial amount of water and to give up a considerable amount of water upon being pressed. These latter attributes are important so that the fabric may pass through a press, such as the press 37, and at that time absorb a considerable amount of water from the web W and release this water under the wringing action of the press, particularly to the perforated vacuum roll 38. The fabric 24 should also be quite porous which is important in connection with the use of the fabric in such a press, since a press of this type tends to cause the water being wrung out of the fabric to travel both transversely and longitudinally through the fabric. The fabric should also have the attribute of tending to retain water within it when in contact with a paper web, rather than tending to release the water in it to the paper web due to capillary action by the web. In other words, its capillary action should preferably be as great if not greater than that of a paper web. The fabric 24 should also be quite flexible or conformable so that it conforms well to the surface of the drier drum 41 whereby the pressure roll 30 may be very effective for additional dewatering of the web and so there is a practically complete transfer of the web to the drum 41. The fabric 24 should also be very smooth, particularly when its surface pores are filled with water, so that there may be substantially a complete transfer of the web W from the wire 10 beneath the pickup roll 26.

A conventional papermarker's felt has been found to have these latter qualities, and it is therefore very suitable for the fabric 24. As is well known, these felts are made generally of wool with relatively small proportions of synthetic fibers sometimes being incorporated for imparting strength to the fabrics.

The felt thus basically is made up of many small wool fibers interlocked together by means of the tiny scales on the individual wool fibers so that the fabric is a uniform fiber mat, with the individual threads of which the fabric was originally woven not being discernible and providing no discernible openings between them, particularly due to the treatment of the felt, such as the fulling of it, subsequent to weaving. With the interlocking and random distribution of the fibers in the felt that exist, the felt has a strong capillary attraction for water and is capable of absorbing a substantial amount of water. It is quite resilient and upon pressure being applied will release much of this water. It will spring back substantially to its original thickness after pressing, as through the press 37, so that it tends to absorb water from the web W subsequent to the press. It is also quite porous so that water may flow longitudinally and transversely through it when pressure is applied, and the felt is quite limp and conformable so that it may conform easily to an associated surface, such as the drier 41. In addition, it has a very smooth surface particularly when carrying a substantial amount of water so that the transfer of the web W from the wire 10 beneath the pickup roll 26 is substantially complete.

As was pointed out above, a felt when used as the fabric 24 advantageously has the high surface smoothness, particularly when nearly saturated with water on its surfaces, so that a substantially complete transfer of the web W is made to the fabric 24 at the pickup roll 26. As is well known, a paper web will follow the more dense carrier at a point of separation of a relatively dense carrier and a relatively open carrier. Actually it is only the surface of the felt that is important insofar as pickup is concerned and which should be substantially saturated with water so that the voids in the surface of the felt are closed.

The ability of the felt to have its surface voids so filled is important from another standpoint—since the voids are thus closed, there cannot be any substantial migration of fines into the felt that might result in felt plugging. The fact that the slice roll 25 is a solid roll is significant also in this respect. The solid roll 25 forms an impermeable backing for the felt and prevents the flow of stock through the felt at the places on the felt subjected to the high pressure of the stock, namely, the portion of the felt about the roll 25 between the lip 57 and the nip of the rolls 11 and 25. If the felt is completely saturated with water, it is clear that the solid backing roll 25 prevents any stock flow through the felt in the high pressure region embraced by the inlet 43; however, since complete water saturation of the felt is not necessary and is not used in practice, there may be some air within the felt. The stock slurry also cannot displace this air due to the presence of the solid backing roll behind the felt; and, although there is a slight compression of the air, this is insignificant.

A papermaker's top felt or other felts of the smoother varieties, are preferred for the fabric 24, as distinguished from other types of felts which are relatively coarse. The bottom felt 39 in accordance with conventional practice is relatively coarse; and, since it is desired that the web W shall remain on the fabric 24 subsequent to the main press 37, the fabric 24 should be smoother than the bottom felt 39.

The fabric 24 has still another advantageous function; namely, it protects the web W in its infancy, immediately after disposition of the stock on the forming wire, and sets the web quickly. Some of the disadvantages of conventional open wire Fourdrinier forming are thus overcome, some of these being wildness and jumping of the stock on the wire and disturbance of fiber position by turning of the wire and stock about table rolls at elevated speeds, all of which result in unevenness and non-uniformity of web formation. The fabric 24 in close proximity to the wire 10 at the slice roll 25 and toward the roll 26 prevents such wildness and jumping of the stock immediately after disposition of the stock on the wire until the stock is dewatered to a point where the web is substantially set, the web being protected until it is capable of being taken off the wire as an entity at the pickup roll 26.

Concisely, the felt 24 has the following principal functions: It protects the web immediately after disposition of the stock on the forming wire until dewatering is sufficiently complete so that relative movement of the fibers of the web W cannot take place; it functions as a resilient porous carrier for the web W allowing substantial dewatering of the web in the main press 37; and it functions to dewater the web W both before and after the main press 37 due to its high capillary attraction for water.

As has been hereinbefore mentioned, one type of conventional slice is a stationary rigid part that bears on a Fourdrinier forming wire for defining the downstream end of a pressure forming region in a pressure forming type of machine. The stationary slice part bears under substantial pressure on the forming wire and substantial resultant wear of the wire must thus be expected. According to the present invention, a moving part is substituted for the stationary slice part which preferably moves at about the same speed as the forming wire, this part being the slice roll 25 covered by the felt 24 in the vicinity of the inlet 43. Increased wire life should therefore result using the present invention.

With the present invention, it is not necessary that there shall be absolute contact between the fabric 24 and the wire 10 at the nip between the rolls 11 and 25. The closest points of these two rolls in effect simply amount of a construction of the conduit carrying the stock flow; and there may, for example, be a spacing of .003 to .005 inch between the fabric 24 and the wire 10 at the nip between the two rolls 11 and 25.

A conventional stationary slice, as before mentioned, also cards and redirects the stock fibers issuing beneath the slice to a certain extent, so that more of them lie in the machine direction than in the cross direction. The slice provided by the roll 25 and the fabric 24, since it is moving, does not provide such a carding action; and the resulting web is more square insofar as strength is concerned, that is, it has a greater cross directional strength than is provided with use of the conventional stationary slice. With the machine of the invention, the cross directional strength can be adjusted with respect to the machine direction strength (the MD/CD ratio) by changing the velocity of the fabrics 10 and 24 with respect to the velocity of the furnish supplied to the nip between the rolls 11 and 25; and this ratio, as well as the formation of the web, may also be adjusted by changing the speed of one of the fabrics 10 and 24 with respect to the other—if maximum web uniformity is desired, the speed of the fabrics 10 and 24 are maintained about the same.

Theoretically, using a conventional stationary slice, it is possible to generate a more square sheet simply by pumping stock to the pressure forming region at greater than usual velocities and pressure—the velocity of the stock should be about the same as the velocity of the wire for these results. This, however, necessitates an adjustment of the stationary slice so that it bears on the wire under the higher pressures necessary to contain the higher pressure stock in the pressure forming region; but these higher slice pressures result in undue wire wear. The higher stock pressures may be generated using the rolling slice roll without such undue wire wear, and the roll 25 in effect provides a relatively frictionless mechanism for sealing the end of the pressure forming region 51. Obviously, a moving member may be brought down harder on a stock draining screen to contain higher generated stock pressures than a stationary slice member. Incidentally, the conventional stationary slices have a tendency to become plugged with fibers and to thereby scuff the web. The moving slice roll 25 having the fabric 24 passing over it has no such disadvantages since it does not tend to hold back the stock flow but rather moves along with it.

The consistencies of the stock slurries supplied to the inlet 43 and pressure forming region 51 are not critical with the moving slice as disclosed. As in conventional papermaking apparatus, the stock consistency should vary with the velocity of the stock jetted on the forming fabric in order to obtain the desired basis weight of the resulting web—the higher the jet velocity is, the lower the stock consistency should be, for the same basis weight of web.

Although we have illustrated the seal 57 between the inlet 43 and the fabric 24, and the lip 46 is also included in the inlet for substantially sealing the inlet with respect to the wire 10 and roll 11 (even though there may be, in actual practice, a small gap of a fraction of an inch between the plate 47 and the wire 10), and the opposite ends (not shown) of the inlet 43 should also be sealed; we have found that if desired, such sealing by the seal 57 and lip 46 is not necessary in the event that a pressure forming operation is not desired. If the inlet 43 is moved away from the rolls 11 and 25 an inch or two, the papermaking machine will still be satisfactorily operative; however, in this case, the rolls 11 and 25 should be moved farther apart, to be apart ½ inch to 1 inch, for example, to allow the stock under only the dynamic pressure due to its velocity of emission from the inlet 43 to enter between the rolls and between the forming wire 10 and felt 24. The wire 10 and felt 24 function in this case also substantially the same as above described.

Although the roll 25 is shown as being smaller in diameter than the roll 11—and this is the preferable arrangement—since the rolls and associated parts fit very conveniently with these roll sizes, it is obvious that the sizes of the rolls may be varied. They should of course have sufficient diameter to be stable for the complete width of the machine. Speeds of operation also are not critical; the machine may be expected to be useful at high papermaking speeds. Both sheet formation and MD/CD web ratio can be controlled by varying the stock speed with respect to the speed of the wire. For a low MD/CD web ratio, the speed of the stock jetting on the forming region 51 and the speeds of the wire 10 and fabric 24 should be about equal. The direction in which the stock is jetted into the nip between the rolls 11 and 25 may also be varied as desired; however, it is deemed preferable that some of the stock from the conduit 45 be jetted directly on the pressure forming region 51 on the wire 10. The length of the forming section 51 also is not critical; however, the forming length should preferably be increased under high speeds of operation as compared with low operating speeds. The forming length also depends on the furnish that is used: if the furnish is relatively slow draining, in this case the forming length should be greater, and vice versa. A satisfactory forming length of four inches has successfully been used in an actual operating embodiment of the invention.

Although the particular types of Fourdrinier forming wires that are used with conventional stationary slices in pressure forming machines may be somewhat critical with respect to certain desired MD/CD ratios of the resulting web, the types of forming wires that may be used with the rolling slice as disclosed are not critical. Since the moving fabric 24 in lieu of a conventional stationary slice is presented to the stock being supplied to the forming region 51, any protuberances on the forming wire 10 apparently have little effect in turning the fibers; and, therefore, with the rolling slice as disclosed, a monoplane type of wire which has no upstanding protuberances in either the machine direction or the cross direction has been found to be very satisfactory and in fact has been found to give less knuckle marking of the web than do forming wires having upstanding knuckles extending in either one direction or the other on the forming side of the wire. Also, in conventional machines, high shute knuckles or protuberances on the forming wire are sometimes provided for keeping the staitonary slice clean of fibers, but these are obviously not needed with the rolling slice. The moving slice of the invention thus is much more compatible with respect to the types of forming wires that may be used than are conventional pressure forming machines.

The breast roll, slice roll and inlet assembly illustrated in FIG. 3 includes a suction breast roll 100 which may be substituted for the breast roll 11 in the papermaking machine as illustrated in FIGS. 1 and 2. The suction breast roll 100 comprises a fixed inner shell 101 and a rotatable outer shell 102. A pair of partitions 103 and 104 are disposed between the shells 101 and 102. The shells and partitions form a vacuum gland 106, and the shell 102 is provided with holes 107 therethrough (see FIG. 4); and a plurality of vanes 108 are set into the exterior surface of the shell 102 and are slanted in the direction of rotation of the roll 100.

The roll 100 is disposed in the same position in the papermaking machine as is the roll 11 and has a nip with a slice roll 25a which is similar to the slice roll 25 illustrated in FIGS. 1 and 2. Fabrics 10a and 24a, similar to the fabrics 10 and 24 extend around the rolls 100 and 25a, and an inlet 43a similar to the inlet 43 is disposed to provide paper stock to the nip between the rolls 100 and 25a. The FIG. 3 arrangement has a forming area 51a between the lip 46a and the nip of the rolls 100 and 25a corresponding to the forming area 51 in the first described embodiment.

The papermaking machine with the vacuum breast roll 100 substituted for the open breast roll 11 functions in the same manner as has been previously described in connection with the machine illustrated in FIGS. 1 and 2, except that the vacuum breast roll tends to draw more of the white water from the stock deposited on the breast roll into the roll than does the simple open breast roll 11. The white water is drawn between the vanes 108 by the vacuum effective through the holes 107, and centrifugal force throws out this water after a partial revolution of the roll 100.

It is preferred that the partition 103 be located slightly upstream of the nip between the rolls 100 and 25a and that the partition 104 be correspondingly spaced from the partition 103 in the direction of rotation of the roll 100. The first partition 103 of the gland 106 is close to the nip between the rolls 100 and 25a due to the fact that it has been found best to have a low forming pressure at the first part of the forming area 51a adjacent the end of the lip 46a and higher forming pressures toward the end of the forming area, as has been previously mentioned. Low pressures should preferably exist at the first point of disposition of the fibers on the fabric 10a, so that the initial fibers are deposited on the fabric relatively loosely, rather than being embedded into the meshes of the fabric which would cause subsequent pickup trouble; and, since there is a greater resistance to flow through the formed web at the end of the forming area, close to the nip between the rolls 100 and 25a, it is preferred that higher pressures exist close to the end of the forming area. Also, positioning the gland 106 in its illustrated position assures that it is not substantially open to atmosphere as would be the case if it were located counterclockwise from its illustrated position, closer to the lip 46a; and the gland 106 in its illustrated position is substantially sealed by the water held by the breast roll 100, prior to the water being thrown out of the breast roll by centrifugal force.

The degree of vacuum desirable in the gland 106, like the degrees of vacuum desirable in the suction boxes 42 and 40, is not critical. A vacuum up to six inches of mercury is satisfactory. An excessive degree of vacuum in the gland 106 of course should be avoided, so that the fines are not pulled into the fabric 10 to render it unduly difficult to pick the web W off the fabric 10 to the pickup roll 26. An excessively high stock pressure within the inlets 43 and 43a, incidentally, should be avoided for the same reasons.

The assembly illustrated in FIG. 5 is substantially the same as that illustrated in FIG. 2 except that a stationary shoe 115 has been substituted for the rotatable slice roll 25. The shoe 115 has a curved surface 116 around which the fabric 24b travels, and the shoe has a nip with the open breast roll 11b similar to the nip of the roll 25 with the breast roll 11 in the first illustrated form of the invention. The FIG. 5 assembly functions in the same manner as that illustrated in FIG. 2 except that the fabric 24b has a slipping action with respect to the stationary shoe 115 rather than the rolling action between the fabric 24 and the slice roll 25 in the first form of the invention.

The papermaking machine illustrated in FIG. 6 is basically the same as that illustrated in FIG. 1 except for the following differences:

(1) The roll 13c is lowered with respect to the roll 13 so that an upper pass of the forming wire 10c slants downwardly toward the roll 13c and is out of sustained contact with the fabric 24c;

(2) The slice roll 25c is moved away from the breast roll 11c, so that there is a substantial gap between the rolls 11c and 25c;

(3) The lip 46c is retracted so that it is located nearly above the center of the roll 11c with the inlet 43c being moved along with the roll 25c;

(4) A separate pickup roll corresponding to the roll 26 is omitted, so that the fabric 24c and the wire 10a separate at the roll 25c, which thus functions not only as a slice roll but also as a pickup roll.

Referring to FIG. 6, the forming wire 10c similar to the wire 10 is disposed about the rolls 11c, 13c, 14c, 15c and 16c corresponding to the rolls 11, 13, 14, 15 and 16. The fabric 24c which is similar to the fabric 24 is disposed about rolls 25c, 27c, 28c, 29c, 30c, 31c, 32c, 33c, 34c, 35c and 36c corresponding to the rolls 25, 27, 28, 29, 30, 31, 32, 33, 34, 35 and 36 in the first embodiment.

The FIG. 6 form of machine operates quite similarly to that illustrated in FIG. 1 except that the roll 25c not only functions as a slice roll but also functions as a pickup roll so that the web W travels on the underside of the fabric 24c, immediately after the fabric 24c leaves the roll 25c. The forming area in the FIG. 6 embodiment is between the end of the lip 46c and the point of contact of the roll 25c with the wire 10c, and there thus is considerably more drainage of white water through the wire 10c in the vicinity of the slice roll than with the first form of the invention. The vacuum boxes 80c, 86c and 87c function like the boxes 80, 86 and 87, having a dewatering action on the web W and on the fabric 24c in contact with the boxes.

The papermaking machine illustrated in FIG. 7 is quite similar to the previously described forms but differs principally from them in dispensing with the separate Fourdrinier forming wire and with the bottom felt. A suction breast roll 100d, which is similar to the breast roll 100, is utilized; and it has a jacket 120 completely about its periphery which is of the same fabric that is used for the Fourdrinier wire 10. This embodiment of papermaking machine includes a slice roll 25d similar to the roll 25 having a nip with the breast roll 100d and an inlet 43d which is similar to the inlet 43 above described. The disposition of the rolls 100d and 25d with respect to the inlet 43d is the same as is illustrated in FIG. 3, and this assembly differs only from that illustrated in FIG. 3 by the use of a wire jacket for the breast roll instead of a looped Fourdrinier wire.

A fabric 24d similar to the fabric 24 is used, and this fabric is supported by means of rolls 30d, 31d, 32d, 33d, 34d, 35d and 36d, which are similar to the rolls 30 to 36 respectively, in addition to being supported by the roll 25d and additional rolls 121, 122 and 123. The rolls 121 and 122 are simple turning rolls supporting the fabric 24d in a substantially straight line between the roll 100d and the roll 123. The roll 123 preferably is a suction roll, having a suction gland 124 within the roll and having a perforated exterior shell.

The assembly of the rolls 100d and 25d together with the inlet 43d function in substantially the same manner as do the corresponding parts of the FIG. 3 assembly, with the exception that forming is done on the wire jacket 120 in lieu of a loop of Fourdrinier wire. The roll 25d, like the roll 25c, is a dual purpose roll—it functions to seal the associated inlet so as to act as a slice and it also functions as a pickup roll. The web formed on the exterior surface of the roll 100d is picked up from the surface of the roll 100d by the fabric 24d moving around the roll 25d. The formed web W travels on the undersurface of the fabric 24d across the rolls 121 and 122 to the roll 123. The suction gland 124 in the roll 123 operates through the perforated surface of the roll 123 on the fabric 24d and on the web W carried by the fabric so as to dewater the web to some extent. The suction roll 123 functions similarly to the other suction rolls above described in retaining water drawn from the webs extending around it in its drillings and discharging the water by centrifugal force after the drillings have passed beyond the end of the suction gland within the roll. The fabric 24d and the web carried by it travel from the roll 123 to the presure roll 30d which functions, similarly to the pressure roll 30, to further dewater the formed web and to transfer the web onto the associated drier 41d. The suction boxes 80d, 86d and 87d function to dewater the fabric 24d to some extent, similarly to the suction boxes 80, 86 and 87. The fabric 24d travels back to the slice roll 25d similarly as in the previously described embodiments.

Figure 8:
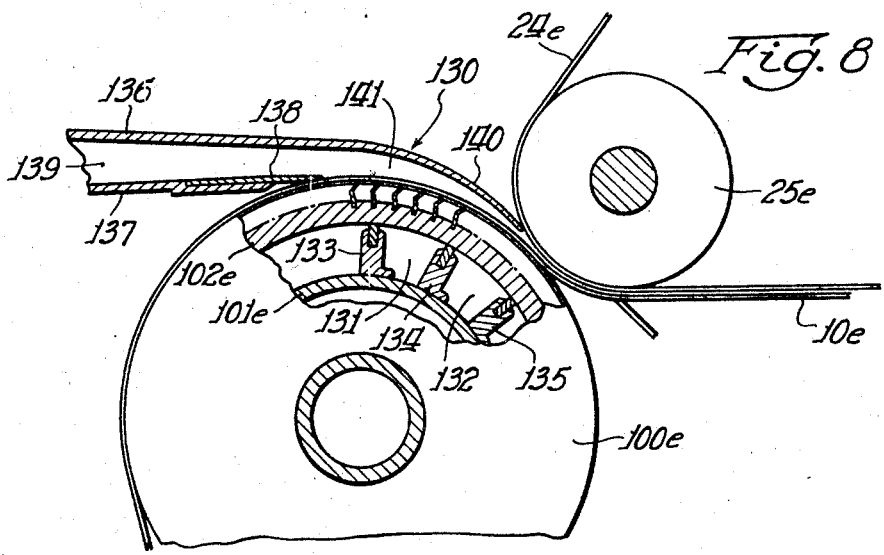
FIG. 8 is a longitudinal sectional view of another type of inlet that may be used in connection with the previously illustrated papermaking machines.

As will be apparent, different types of inlets may be used in lieu of the inlets 43, 43a, 43b and 43c. One modified form of inlet 130 that may be used is illustrated in FIG. 8. The inlet is illustrated in connection with a suction breast roll 100e and in connection with a slice roll 25e. The slice roll 25e is similar to the roll 25 and carries about it a fabric 24e similar to the fabric 24. The roll 100d is similar to the roll 100 shown in FIG. 3, except that the roll 100e has two vacuum glands 131 and 132 within it in lieu of a single vacuum gland. The roll 100e carries the Fourdrinier forming fabric 10e which is similar to the fabric 10. The roll 100e has an internal shell 101e and an external shell 102e similar to the shells 101 and 102; and partitions 133, 134 and 135 are provided between the shells 101e and 102e for the purpose of forming the two vacuum glands 131 and 132. A relatively low degree of vacuum is applied to the gland 131 and a higher degree of vacuum is applied to the gland 132.

The inlet 130 comprises an upper plate 136 and a lower plate 137. The lower plate 137 is substantially flat and carries a lip 138 which is substantially in contact with the roll 100e at the top of the roll. The upper plate 136 slants toward the end of the lip 138 to constrict the stock duct 139 formed by the plates 136 and 137 in the region of the lip 138, and the plate 136 is provided with an arcuately bent end 140 which approaches the nip between the rolls 25e and 100e and which contacts the fabric 24e to further constrict the stock duct 139 in a pressure forming region 141 which is between the end of the lip 138 and the nip of the rolls 100e and 25e. Although the inlet illustrated in FIG. 8 is shown particularly in connection with a breast roll and a slice roll that have a nip, it will be understood that this type of inlet may also be used with the papermaking machine illustrated in FIG. 6 in which there is no nip between the breast and slice rolls simply by elongating the upper plate 136.

In operation, stock under pressure is supplied to the duct 139, and the stock is deposited on the web forming region 141 on the wire 10e to form a paper web thereon. Water drains through the wire 10e into the suction breast roll 100e, and the vacuum glands 131 and 132 function to draw white water through the interstices of the fabric 10e and into the drillings in the external shell 100e, the water being thrown out of the roll 100e after a partial revolution. The web continues between the fabrics 10e and 24e which together form a sandwich for the web if they are together as in the FIG. 1 embodiment.

It will be noted that, in the initial part of the forming region 141 just downstream of the lip 138, neither one of the vacuum glands 131 and 132 is effective, so atmospheric pressure, therefore, is effective within the roll drillings in this part of the forming region. The low vacuum gland 131 is effective in the middle portion of the forming region 141, and the high vacuum gland 132 is effective in the final portion of the forming region 141 and slightly beyond the nip between the rolls 100e and 25e. There, thus, is a relatively low pressure on the stock tending to deposit it on the forming wire 10e at the beginning of the forming area; and higher pressures exist beyond, toward the nip of the rolls, for the purposes that have been previously mentioned.

Although the above described papermaking machines are suitable for making papers of heavy weight as well as light weight, particularly since conventional stationary slices are not utilized for sealing the pressure forming regions with respect to the forming wires, they are, however, at high speeds particularly suitable for light weights of paper; therefore, the papermaking machine illustrated in FIG. 9, which is more particularly useful with heavier weights of paper, such as book paper, due to inclusion of extra dewatering and drying devices, is being disclosed to illustrate our rolling slice principle in connection with such a type of machine, the machine illustrated in FIG. 9 comprises fabrics 10f and 24f which are similar to the fabrics 10 and 24. The fabric 10f is supported by means of rolls 14f, 15f and 16f similar to the rolls 14, 15 and 16 and a roll 100f similar to the roll 100e and rolls 150 and 151. The roll 100f is of the suction type and has a pair of suction glands 131f and 132f. A suction box 79f, a table roll 12f and a doctor 78f, similar to the parts 79, 12 and 78 in the first described embodiment, are provided beneath the pass of the fabric 10f between the rolls 100f and 150. The roll 25f is positioned opposite the glands 131f and 132f similarly to the roll 25e in the FIG. 8 assembly. An inlet 43f which is similar to the inlet 43 is used in connection with the rolls 100f and 25f. The roll 151 is a solid roll, and the roll 150 is a suction couch roll which has a perforated external shell and has a suction gland 152 therein. The fabric 24f is supported by rolls 25f, 34f, 35f, and 36f similar to the rolls 25, 34, 35 and 36 and by means of rolls 153, 154, 155 and 156. The rolls 153 and 154 are simple turning rolls, and the roll 155 is part of a transfer press 157. The roll 156 is a pickup roll and comprises a perforated external surface and a vacuum gland 158 within the roll.

A bottom felt 159 is provided which is in contact with the fabric 24f and is supported by means of suitable guide, stretch and turning rolls and roll 160. The rolls 161 and 162 constitute a main press 173 for the bottom felt 159, and the rolls 168 and 169 constitute wringer rolls.

A press felt 175 is provided which is supported by suitable guide, stretch and turning rolls. The rolls 176 and 177 have a pressure nip between them and constitute a third press 184.

A plurality of so-called can driers, such the driers 189 and 190, are provided for drying the paper web W produced by the machine; and suitable supporting rolls for the web, such as the roll 191, may be utilized between the felt 175 and the dryers.

In operation, the inlet 43f produces a web on the forming fabric 10f and between the fabrics 10f and 24f substantially as has been previously described, particularly in connection with the constructions shown in FIGS. 1 and 3. As the fabrics 10f and 24f move, the web W travels over the roll 150, and the web W is separated from the wire 10f beneath the pickup roll 156, with the vacuum gland 158 functioning to help in transferring the web onto the bottom surface of the fabric 24f free of the fabric 10f. The web W travels through the transfer press 157, and the press functions to dewater the web and to transfer it onto the bottom felt 159 in accordance with well known principles of operation of such presses. The web travels with the bottom felt 159 to the main press 173, and this press also dewaters the web in accordance with well known principles of operation. The rolls 168 and 169 function as wringer rolls to remove excess water from the felt 159 that is absorbed from the web.

After dewatering by the press 173, the sheet is strong enough to have a free draw, and it proceeds from the belt 159 into the third press 184. This press also functions to further dewater the web. After such further dewatering, the web W proceeds over the roll 191 onto the can driers which dry the web.

It is obvious that different types of inlets may be used in connection with the rolling slice construction illustrated in FIG. 9. For bookpaper machines, conventional headboxes are in general use, and such headboxes may be used in lieu of the inlet 43f if desired. In this connection, a headbox 200 of the pressure type in which an air pad under pressure is maintained above the level of the stock within the headbox is illustrated in FIG. 10. The headbox 200 is provided with a tapering outlet snout 201 which terminates in close relation to the loops of fabrics 10g and 24g which correspond to the fabrics 10 and 24. The fabric 24g is supported by a slice roll 25g corresponding to the slice roll 25, and the fabric 10g is supported by an open suction roll 100g which has a suction gland 106g within it and which corresponds to the suction roll 100. A perforated distributor roll 202 driven from any suitable motor (not shown) is provided within the headbox 200 adjacent the snout 201 for giving turbulence to and deflocing the stock that proceeds through the snout 201 into the nip between the rolls 25g and 100g. In operation, the headbox 200 spouts stock into the nip between the rolls and between the fabrics 10g and 24g to form a web therebetween, and the web is dewatered and dried by the remainder of the machine illustrated in FIG. 9 as has just been described. It will also be apparent that the pressure type of headbox illustrated in FIG. 10 may also be used in connection with any of the other papermaking machines above described, if desired.

An open type of headbox 203 is illustrated in FIG. 11, and this may be substituted if desired for the closed type of headbox illustrated in FIG. 10. The headbox 203 includes a distributor roll 202h, and the headbox 203 has a snout 201h discharging between a slice roll 25h and an open type breast roll 100h, which are respectively similar to the slice roll 25 and the breast roll 100.

A somewhat different type of papermaking machine which is very suitable for the high speed production of light basis weight paper and which utilizes fabrics 10j, 39j and 24j, similar to the fabrics 10, 39 and 24, is illustrated in FIGS. 12 and 12A. This machine comprises a breast roll 210 and a slice roll 211 disposed opposite each other on centers in the same horizontal plane. The roll 211 is larger than the roll 210 as illustrated, and may be a solid roll. The roll 210 is preferably an open roll, similar to the roll 11 in the first described embodiment of the invention. The breast roll 210 carries the Fourdrinier forming wire 10j, and the slice roll 211 carries both the fabric 24j as well as the forming wire 10j. A stock inlet 43j, similar to the inlet 43, is disposed above the two rolls in substantially a vertical position and is supplied with paper stock from any suitable source.

The forming wire 10j is supported by means of the rolls 210 and 211 and, in addition, by means of rolls 212, 213, 214, 215, 216, 217, 218, 219, 220, 221 and 222. The rolls 213, 215, 216, 217, 200, 221 and 222 are simple turning rolls; the roll 212 is a so-called takeoff roll; the roll 214 may be considered a couch roll; the roll 218 may be used as a stretch roll; and the roll 219 may be used as a guide roll. Suitable conventional adjusting mechanism (not shown) may be provided in connection with the roll 218 for moving both of its ends simultaneously so that the wire 10j may be retained taut about its rolls, and suitable conventional guide mechanism (not shown) may be utilized in connection with the roll 219 for suitably moving one of its ends so as to maintain the wire 10j travelling in substantially the same path about its supporting rolls. The takoff roll 212 may be a solid roll, but it is preferably a perforated roll having a suction gland 223 within it. A vacuum box 224 is preferably provided beneath the pass of the wire 10j between the rolls 212 and 213. Various auxiliary equipment for keeping the rolls and wire 10j clean may be provided, such as the doctors 225, 226, 227, 228 and 229, and showers 230, 231, 232, 233 and 234. Water deflecting blades 235 and 236 are preferably provided beneath the roll 211; and a water collecting tray 237 is provided beneath the rolls 210 and 211, as well as beneath the pass of the wire 10j between the rolls 212 and 213, for collecting water draining from these parts.

The fabric 24j is supported by the rolls 211, 212 and 213 and in addition by rolls 238, 239, 240, 241, 242, 243, 244, 245, 246, 247, 248 and 249. The roll 238 is a so-called pickup roll that may be adjustably held on the pass of the wire 10j between the rolls 213 and 214 by means of mechanism 250; the roll 239 constitutes one roll of a main press 251 which also includes a roll 252 having a nip with the roll 239. The roll 239 is adjustably mounted, and a motor 253 of any suitable type is effective on the roll 239 for holding it to have a force nip with the roll 252. As will be observed, the fabric 24j and also the bottom felt 39j pass through the main press 251. The rolls 240, 241, 243, 244, 245, 247 and 249 are simple turning rolls. The roll 242 is a pressure roll having a nip with the Yankee drier drum 41j which is similar to the drum 41, and the pressure roll 242 has a vacuum gland 254 opposite its nip with the drum 41j. The roll 246 may be utilized as a stretch roll and is adjusted simultaneously on both ends by any suitable mechanism (not shown) for maintaining the fabric 24j taut. The roll 248 may be used as a guide roll to be controlled by suitable automatic mechanism (not shown) for shifting one of its ends so as to maintain the fabric 24j moving in the same path about its supporting rolls.

A pair of suction boxes 255 and 256 preceded by a shower 257 are provided on the pass of the fabric 24j between the rolls 244 and 245 for the purpose of cleaning and removing fines from the fabric 24j.

The bottom felt 39j is supported by means of suitable guide, stretch and turning rolls. The roll 265 is movably mounted and is under the control of a motor 266 of any suitable type so as to have a pressure nip with the roll 263, so that the rolls 263 and 265 form a wringer 267 for the felt.

In operation, the stock slurry is supplied to the inlet 43j which functions similarly to the inlet 43 in deflocing and mixing the stock fibers and water. Any suitable ones of the rolls supporting the fabrics 10j, 24j and 39j are driven, so that the fabrics move in the directions indicated; and the rolls 210 and 211 respectively move clockwise and counterclockwise as seen in FIG. 12. The drum 41j is also driven so that it moves in the indicated direction. The wire 10j extends around the roll 210 and it bridges the gap between the rolls 210 and 211 as is apparent from FIG. 13. The inlet 43j discharges the mixture of fibers and water between the two rolls 210 and 211; and, therefore, the discharge is particularly on the wire 10j. The wire 10j extending around the roll 211 is separated from the fabric 24j by a draining mass of stock throughout a forming region beginning at the end of the lip 46j and extending for a substantial angle around the roll 211. As will be noted from FIG. 13, the lip 46j is located some distance above the horizontal plane containing the centers of the two rolls 210 and 211; and, therefore, the stock drains under pressure through the wire 10j and into the roll 210.

As with the open breast rolls above described, the water at first is retained by the vanes extending at their ends in the direction of rotation of the breast roll 210, and the water is thereafter thrown out of the breast roll by centrifugal force. Water continues to drain from the stock between the wire 10j and fabric 24j, as the fabrics continue around the forming roll 211, due to the gravity effect on the water in the stock, due to the centrifugal force effect on the water with the travel of the wire 10j and fabric 24j about the rotating slice roll 211, due to the initial pressure with which the stock is discharged into the gap between the rolls 210 and 211 and due to the force with which the wire 10j bears on the fabric 24j and the roll 211 because of the inherent tension in the wire 10j. The web W thus loses much of its water by the time it reaches the takeoff roll 212, and the suction box 223 in the roll 212 helps in dewatering the web. The suction box 224 beneath the wire 10j in its pass between the rolls 212 and 213 also assists in dewatering the web, and the web W has sufficient body to separate from the wire 10j beneath the pickup roll 238 and travel thereafter toward the press 251 on the bottom surface of the fabric 24j.

The main press 251 functions to further substantially dewater the web W as it passes through the press, and the wringer 267 maintains proper moisture conditions in the bottom felt 39j.

The web W travels with the fabric 24j beneath the rolls 240 and 241 and through the nip between the pressure roll 242 and the drier drum 41j for transfer onto the drier drum.

With respect to the rolls 210 and 211, the roll 211 is preferably a solid roll for the same reasons that the slice roll 25 is solid. The roll 210 may also be solid, if desired, but it is preferably of the open type as above mentioned, since it may then receive water draining from the stock and subsequently discharge it on a partial revolution for aiding in dewatering and forming the web. Although the roll 211 is preferably larger in diameter than the roll 210, it is not necessarily so. The roll 210 may, for example, have a diameter of about two feet and the roll 211 may, for example, have a diameter of about three feet. A significant factor in the operation of this machine is the rate of closure between the wire 10j and the fabric 24j about the roll 211 downwardly from the nip between the rolls 210 and 211, and if this rate of closure is too rapid or too abrupt, with respect to the velocity of the stock, if the diameter for the roll 211 is too small, for example, the pressure of the stock builds up too abruptly between the wire 10j and the fabric 24j and the stock is forced backwardly. The diameter of the roll 211 thus is significant with respect to stock velocity.

The gap between the rolls 210 and 211, or more particularly the gap between the wire 10j and fabric 24j at the closest points of the rolls 210 and 211, is significant—obviously a larger gap will accommodate a greater stock flow than a smaller gap. If the gap width is too narrow to accept the amount of stock discharged by the inlet 43j, there is stock rejection or crushing; and, obviously, the gap between the rolls 210 and 211 may be increased so as to increase the capacity of the machine to accept stock from the inlet 43j. Gap sizes that are somewhat larger than necessary are permissible and incidentally, do not noticeably affect the MD/CD ratio of the resulting web. The sizes of the gaps may be about the same as the gaps between the fabric 24 and wire 10 in the first embodiment of machine.

As is apparent from the drawings, the forming area on the wire 10j extending downwardly from the closest points of the rolls 211 and 210 is substantially a cylindrical section, the other side of the forming area being defined by the fabric 24j in contact with the round roll 211. The distance between the fabric 24j and the wire 10j in the forming area is determined to some extent as is apparent by the tension on the wire 10j. In a particular machine of the type illustrated in FIGS. 12 and 12a, a wire tension of 18 pounds per lineal inch was satisfactory, and it is obvious that this tension may be varied considerably. The wire tension should also be changed preferably with the type of paper that is being made, the tension being preferably made greater with higher consistency furnishes at a constant web basis weight. In this particular machine, with a 36 inch diameter forming roll 211 and with a wire tension of 18 pounds per lineal inch, the pressure of the stock in the gap between the fabric 24j and the wire 10j was found to be about one pound per square inch which was very satisfactory for a tissue sheet of basis weight of 7½ pounds per ream of 2880 square feet (uncreped), the machine being run at 3000 feet per minute. These same conditions were satisfactory for a heavier weight sheet of 20 pounds per ream made at 2000 feet per minute and were also satisfactory for making a book type paper of 29 pounds per ream at 1500 feet per minute.

Thus, two significant quantities in determining the path that the wire 10j takes below the closest points of the rolls 210 and 211 are the diameter of the forming roll 211 and the tension on the wire 10j. The tension on the fabric 24j is not particularly significant, since it is the wire 10j which, due to its tension, is holding the sheet being formed with respect to the forming roll 211 and is forcing the drainage. The wire tension divided by the diameter of the roll 211 is a parameter indicative of the pressure in the forming region between the wire 10j and fabric 24j.

Although gravity and centrifugal force on the stock are significant factors insofar as liquid drainage from the stock is concerned, they are minor factors, amounting to no more than ⅙ or ⅕ of the total drainage force, as compared to the pressure of the slurry from the inlet 43j within the wedge formed by the wire 10j and the fabric 24j.

Preferably when furnishes are used that are of the less freely draining type, such as for book paper instead of tissue, some of the operating conditions for the machine should be changed. The wire 10j should preferably be more slack for more heavier weight sheets. The resistance to drainage by the stock furnish is a critical factor and the pressure of the stock within the inlet 43j is preferably increased for heavier web weights. The machine speed is generally decreased for increased web weights; the diameter of the roll 211 may well be increased for heavier web weights and the tension of the wire 10j may also be increased, although, as noted above, more slack in the wire should exist for the heavier weight webs in the forming area.

The forming area or length of the machine, between the end of the lip 46j and the line on the roll 211 at which dewatering is substantially completed of free water in the web under the action of centrifugal force, gravity and the pressure developed due to wire tension, moves around the roll 211 with changes in various factors. The most important parameters affecting the forming length are the weight of the web W, the machine speed, the wire tension, the diameter of the forming roll 211, the gap between the rolls 210 and 211 and the amount and velocity of stock that is forced between the two rolls 210 and 211. For example, as the machine speed, the resistance to drainage and the basis weight are increased, the forming area increases in length, farther around the roll 211 toward the takeup roll 212, and such increases of forming length can be counteracted by an increase in wire tension. As an example, for a certain case, it was determined that the forming length around the roll 211 was to a line spaced 40 degrees from the nip between the rolls 210 and 211; however, this length could be varied within wide limits by varying the factors discussed above.

The takeoff roll 212 may be either of the open or closed type, but is preferably the former. A solid takeoff roll acts as a conventional table roll, removing water at its outgoing nip with the wire 10j. If the roll 212 is of the open type, the vacuum gland 223 removes some of the water from the web W through the wire 10j. The roll 212 may have a pressure nip with the roll 211 if desired, in which case the rolls 211 and 212 function as wringer rolls; however, there may be a small gap, if desired, between the rolls 211 and 212, and satisfactory operation is had under these conditions also. The vacuum box 224 functions also to dewater the web W to some extent.

The pickup roll 238 is located to contact the fabric 24j substantially midway between the rolls 213 and 214; however, obviously the roll 238 may be moved if desired to have a nip with the roll 214. The fabric 24j is of the same type as the fabric 24 described in connection with the first embodiment of papermaking machine, preferably being a top felt which has the pores on its outer surfaces filled with water so that there is a good pickup of the web W on the fabric 24j.

The main press 251 functions in the same manner as the press 37 in the first described embodiment; and the press 251 was found in a certain prototype machine constructed in accordance with the showing of FIGS. 12 and 12A to provide a substantial gain in consistency of the web, using a top felt as the fabric 24j. Consistency (percent dry as defined above) of the web prior to the main press 251 was between 6 and 13 percent and was between 23 and 30 percent subsequent to the press 251.

In view of the fact that this embodiment of machine also does not have a stationary slice contacting the forming wire, this machine also provides a resulting web that has a relatively low MD/CD ratio, particularly when the velocity of the stock entering between the rolls 210 and 211 is about the same as the velocity of the wire 10j and fabric 24j. Preferably, the velocities of the fabrics 10j and 24j are maintained about equal so that there is no scuffing of the web between the passes of the wire 10j and the fabric 24j that are in substantial contact.

Although the inlet 43j is illustrated as being sealed with respect to the fabric 24j and the wire 10j travelling respectively around the rolls 210 and 211, such sealing of the inlet is not necessary; and the inlet 43j may actually be raised out of contact with the fabric 24j. In this case, the inlet 43j simply shoots the furnish between the rolls 210 and 211; and pressure forming in its strict sense, utilizing a forming region on the forming wire for closing a stock inlet in which stock travels under pressure, is not used. When this change is made, the gap between the rolls 210 and 211 is preferably increased, since the static pressure of the stock at the nip of the rolls 210 and 211 is less.

The various embodiments of the invention above described each have in common a stock inlet which discharges into a nip between a pair of rolls, with one of the rolls carrying a forming wire and the other carrying a fabric, and a press subsequently effective on the fabric for substantially dewatering the web formed on the wire. The fabric, at least under the operating conditions of the apparatus, should be denser than the forming wire, so that the formed web adheres to the fabric and is drawn away from the wire. In order that the web may be effectively dewatered in the press, the fabric is preferably one that is resilient, compressible and porous; and a felt has been found to satisfy all of the required conditions for the fabric and thus is preferably used in connection with the forming wire.

The papermaking apparatus of the invention is particularly of the pressure forming type in which papermaking stock, while contained within an enclosed flow conduit, is applied to a restricted area section of a forming wire as the latter is moved across the discharge end of the conduit. As has been explained, however, the stock inlets need not be sealed with respect to the wire; and, therefore, true pressure forming may be dispensed with while still obtaining satisfactory operating conditions. In conventional machines of the pressure forming type, the downstream end of the restricted area forming section is defined by a fixed slice bearing on the web draining screen; and, in our improved apparatus, the fixed slice is replaced by a moving element, so that the carding of the fibers and the collection of fibers that sometimes occurs on such stationary slices are not obtained, with the resultant advantages of improved web formation and a lower MD/CD ratio of the web. Also, since the slice is not of the stationary type, thicker webs may successfully be formed under pressure forming conditions using the machines of the invention. In view of the fact that the slice is defined by a curved surface carrying a moving fabric web around it, there is no collection of fibers that would result in poor formation by the curved surface.

Preferably the formed web subsequent to the forming section between the wire and fabric is initially protected in a sandwich formed by this fabric and forming wire to obtain more uniform web formation; however, this sandwich is not necessary if not desired. No particular types of forming wire need be used and our moving slice apparatus is considerably more compatible with respect to satisfactory types of forming wires that may be used than is the conventional stationary slice construction. The improved apparatus may be run at many different speeds and all usual papermaking furnishes and furnishes of many different consistencies are suitable for use with the apparatus of the invention.

We wish it to be understood that the invention is not to be limited to the specific methods, constructions and arrangements shown and described, except only insofar as the claims may be so limited, as it will be apparent to those skilled in the art that changes may be made without departing from the principles of the invention.

We claim:

1. In a paper web forming machine, the combination of a first endless paper web forming fabric having interstices therethrough for draining paper stock deposited thereon, means for moving and supporting said fabric and including a member having a curved surface about which the fabric extends, a second endless fabric, said second fabric comprising a multitude of randomly oriented interlocked matted fibers so that said second fabric has no discernible interstices therethrough and is substantially compressible to absorb and release substantial amounts of water, means for moving and supporting said second fabric and including an element about which said second fabric moves having a curved surface approaching and in proximity to said first named curved surface, means for depositing paper stock on said first fabric and including a paper stock inlet arranged to direct the stock between said curved surfaces of said element and member and thereby between said two fabrics whereby the stock drains through said first fabric to form a web thereon which subsequently follows said second fabric.

2. In a paper web forming machine, the combination of an endless paper web forming fabric having interstices therethrough for draining paper stock deposited thereon, means for moving and supporting said fabric and including a rotatable roll about which the fabric extends, an endless felt, means for moving and supporting said felt and including a second rotatable roll about which the felt moves and located in proximity to said first named roll, means for depositing paper stock on said fabric and including a paper stock inlet arranged to direct the stock between said two rolls and thereby between said fabric and said felt whereby the stock drains through said fabric to form a web thereon which subsequently follows said felt, and means for pressing said felt and the paper web carried thereon for substantially dewatering the paper web.

3. In a paper web forming machine, the combination of an endless paper web forming fabric having interstices therethrough for draining paper stock deposited thereon, means for moving and supporting said fabric and including a rotatable roll about which the fabric moves, an endless felt, means for moving and supporting said felt and including a second rotatable roll about which the felt moves and which is located in proximity to said first named roll and which has a solid periphery supporting the felt, means for depositing paper stock onto said fabric and including a paper stock inlet arranged to direct the stock between said two rolls and thereby between said fabric and said felt whereby the stock drains through said fabric to form a paper web thereon which subsequently follows said felt, and a pair of additional rolls having a press nip between them for pressing said felt and the paper web carried thereon for substantially dewatering the paper web.

4. In a paper web forming machine, the combination of an endless paper web forming fabric having interstices therethrough for draining paper stock deposited thereon, means for moving and supporting said fabric and including a member having a curved surface about which the fabric extends, an endless felt, means for moving and supporting said felt and including an element about which the felt moves having a curved surface approaching and in proximity to said first named curved surface, means for depositing paper stock on said fabric and including a paper stock inlet arranged to direct the stock between said curved surfaces of said element and member and thereby between said fabric and said felt whereby the stock drains through said fabric to form a web thereon which subsequently follows said felt, a pair of rolls having a press nip between them for pressing said felt and the paper web carried thereon for substantially dewatering the paper web, a rotatable drier drum for subsequently carrying the paper web on its external surface for drying the web, and means for transferring the paper web from said felt to said drum and for additionally dewatering the paper web on its transferral to the drum and including a pressure roll forcing said felt and the paper web against the drier drum.

5. In a paper web forming machine, the combination of an endless paper web forming fabric having interstices therethrough for draining paper stock deposited thereon, means for moving and supporting said fabric and including a roll about which the fabric extends, an endless felt, means for moving and supporting said felt and including an element about which the felt moves having a curved surface approaching and in proximity to the external surface of said roll to form a nip of the curved surface and roll, said roll having a perforate periphery for draining water from stock deposited on said fabric, a source of supply of paper stock under pressure, and a paper stock inlet connected with said source and arranged to direct stock between said element and said roll and thereby between said fabric and said felt, said inlet substantially sealing said stock with respect to said fabric and said felt and said curved surface and roll substantially sealing said fabric and felt at said nip so that the stock is deposited on the fabric under pressure forming conditions and forms a paper web on the fabric prior to said nip which web subsequently follows said felt.

6. In a paper web forming machine, the combination of an endless paper web forming fabric having interstices therethrough for draining paper stock deposited thereon, means for moving and supporting said fabric and including a plurality of rotatable rolls holding the fabric in the form of a loop, an endless felt, means for moving and supporting said felt and including a plurality of additional rolls which hold the felt in the form of a loop and one of which has a solid peripheral surface, one of said first named rolls having a perforate external surface and having a series of vanes within the perforate surface with terminal portions slanting in the direction of rotation of the roll and having a nip with said additional roll with said solid peripheral surface, a source of supply of paper stock under pressure, a paper stock inlet connected with said source and arranged to direct stock between said perforate roll and said solid periphery roll and thereby between said fabric and said felt, said inlet substantially sealing said stock with respect to said fabric and said felt and said two last named rolls substantially sealing said fabric and said felt at said nip so that the stock is deposited on the fabric under pressure forming conditions and forms a paper web on the fabric prior to said nip which subsequently follows said felt, and a pair of still additional rolls having a press nip between them for pressing said felt and the paper web carried thereon for substantially dewatering the paper web.

7. In a paper web forming machine, the combination of an endless forming fabric having interstices therethrough for draining paper stock deposited thereon, means for moving and supporting said fabric and including a rotatable roll about which the fabric passes, an endless felt, means for moving and supporting said felt and including a stationary shoe having a curved surface approaching and in proximity to the external surface of said roll, means for depositing paper stock on said fabric and including a paper stock inlet arranged to direct the stock between said shoe and said roll and thereby between said fabric and said felt whereby the stock drains through said fabric to form a paper web thereon which subsequently follows said felt, and a pair of press rolls having a press nip between them for pressing said felt and the paper web carried thereon for substantially dewatering the paper web.

8. In a paper web forming machine, the combination of an endless forming fabric having interstices therethrough for draining paper stock deposited thereon, means for moving and supporting said fabric and including a rotatable roll about which the fabric passes, an endless felt, means for moving and supporting said felt and including a rotatable roll about which the felt moves located in proximity to said first named roll, means for depositing paper stock between said rolls and thereby between said fabric and said felt and including a headbox having paper stock therein and having a snout depending from the headbox and extending between said rolls whereby to deposit the stock on said fabric and form a web thereon which subsequently follows said felt, and a pair of press rolls having a press nip between them for pressing said felt and the paper web carried thereon for substantially dewatering the paper web.

9. In a paper web forming machine, the combination of an endless forming fabric having interstices therethrough for draining paper stock deposited thereon, means for moving and supporting said fabric and including a rotatable roll about which the fabric passes, an endless felt, means for moving and supporting said felt and including a second rotatable roll about which the felt moves located in proximity to said first named roll, a source of paper stock under pressure, an inlet connected to said source comprising a lower plate that terminates in close proximity to said first named roll and an upper plate that extends toward said lower plate to form a paper stock conduit between the two plates and which terminates in a curved portion extending toward and embracing said first named roll and ending adjacent said second roll whereby to deposit stock onto the portion of said fabric supported by said first named roll to form a paper web thereon which subsequently follows said felt, said first named roll having a perforate periphery so that the water from the stock deposited on said fabric may discharge from said fabric into the roll so that the web may be formed on the fabric, and a pair of press rolls having a press nip between them for pressing said felt and the paper web carried thereon for substantially dewatering the paper web.

10. In a paper web forming machine, the combination of an endless paper web forming fabric having interstices therethrough for draining paper stock deposited thereon, means for moving and supporting said fabric and including first and second rotatable rolls about which the fabric passes and which provide a pass of the fabric between the two rolls, an endless felt, means for moving and supporting said felt and including third and fourth rotatable rolls, said third roll with said felt passing around it being in contact with said fabric pass with a gap between it and said first roll and said fourth roll being so disposed with respect to said third roll that the pass of said felt provided by said third and fourth rolls extends along but is spaced from said pass of said forming fabric so that said third roll functions as a pickup roll with respect to a web formed on said forming fabric, a source of paper stock under pressure, a stock inlet for directing paper stock into said gap and between said forming fabric and said felt passing around said first and third rolls so as to form a paper web on said forming fabric between said last mentioned two rolls which subsequently follows said felt, and a pair of press rolls having a press nip between them for pressing said felt and the paper web carried thereon for substantially dewatering the paper web.

11. In a paper web forming machine, the combination of a roll having a perforate peripheral surface through which water draining from paper stock may pass for subsequent throwout from the roll under the action of centrifugal force, a jacket of a paper web forming fabric around said roll having interstices therethrough for draining paper stock deposited thereon, an endless felt, means for moving and supporting said felt and including a second roll about which the felt moves located in proximity to said first named roll, means for depositing paper stock on said fabric and including a paper stock inlet arranged to direct the stock between said two rolls and thereby between said jacket and felt whereby the stock drains through the jacket and into said first named roll to form a web on the jacket which subsequently follows said felt, and a pair of press rolls having a press nip between them for pressing said felt and the paper web carried thereon for substantially dewatering the paper web.

12. In a paper web forming machine, the combination of a first endless paper web forming fabric having interstices therethrough for draining paper stock deposited thereon, a second endless fabric, said second fabric comprising a multitude of randomly oriented interlocked matted fibers so that the second fabric has no discernible interstices therethrough and is substantially compressible to absorb and to release substantial amounts of water, means for moving and supporting said two fabrics each in the form of a loop and including an element providing a curved surface about which both of said fabrics pass with substantial arcs and with said first fabric being outermost whereby the two fabrics present a nip on said curved surface at which said fabrics approach each other and are in proximity to each other, and means for depositing paper stock between said two fabrics and including a paper stock inlet arranged to direct stock into said nip so that the stock drains through said first fabric to form a web between said fabrics as they pass around said curved surface with the web subsequently following said second fabric.

13. In a paper web forming machine, the combination of an endless paper web forming fabric having interstices therethrough for draining paper stock deposited thereon, an endless felt, means for moving and supporting said fabric and also said felt each in the form of a loop and including a plurality of rolls, said rolls including a first roll having both said fabric and said felt passing around it for substantial arcs with said fabric being outermost and including also a second roll disposed in proximity to but spaced from said first roll and having said fabric passing around it and bridging to said first roll, means for depositing paper stock on said fabric and including a paper stock inlet arranged to direct the stock between said first and second rolls so that the stock drains through the fabric as the stock passes around said first roll to form a web between said fabric and said felt which subsequently follows said felt, and means for pressing said felt and the paper web carried thereon for substantially dewatering the paper web.

14. In a paper web forming machine, the combination of an endless paper web forming fabric having interstices therethrough for draining paper stock deposited thereon, an endless felt, means for moving and supporting said fabric and also said felt each in the form of a loop and including a plurality of rotatable rolls with a substantial longitudinal tension being applied on said fabric, said rolls including a first roll having a solid periphery and having both said fabric and said felt passing around it with said fabric being outermost and including a second roll disposed in proximity to but spaced from said first roll and having said fabric passing around it and bridging to said first roll so that said felt passes around said first roll for a greater arc than the arc of said fabric passing around said first roll, a source of paper stock, a paper stock inlet connected to said source and arranged to direct stock between said first and second rolls so that the stock drains through a part of the arc of said fabric as it passes around said first roll due to the tension on said fabric and the resultant force applied by said fabric on the stock and felt passing around said first roll so as to form a paper web between said fabric and said felt which subsequently follows said felt, and means for pressing said felt and the paper web carried thereon for substantially dewatering the paper web.

15. In a paper web forming machine, the combination of an endless paper web forming fabric having interstices therethrough for draining paper stock deposited thereon, an endless felt, means for moving and supporting said fabric and said felt and including a plurality of rolls for holding both said fabric and said felt in the form of a loop, said rolls including a slice roll having a solid peripheral surface around which both said fabric and felt extend with said fabric being outermost and including also a breast roll which is smaller in diameter than said slice roll and which is disposed in proximity to but slightly spaced from said slice roll and around which said fabric extends and from which it bridges to said slice roll, said rolls including also a takeoff roll having a nip with said slice roll and around which said fabric and felt pass from said slice roll and which is so spaced with respect to said breast roll that the fabric and felt pass around the slice roll for substantial arcs, said rolls including also an additional roll providing contacting passes of said fabric and felt from said takeoff roll and including also a pickup roll around which said felt passes and separates from said fabric, and means for depositing paper stock on said fabric and including a paper stock inlet arranged to direct the stock between said breast and slice rolls and thereby between said fabric and said felt, whereby the stock drains through said fabric in a part of its said arc about said slice roll to form a web between said fabric and felt which subsequently follows the felt at said pickup roll.

16. In a paper web forming machine, the combination of an endless paper web forming fabric having interstices therethrough for draining paper stock deposited thereon, means for moving and supporting said fabric and including a first set of rolls about which the fabric passes and which hold the fabric in the form of a loop, an endless felt, means for moving and supporting said felt and including a second set of rolls about which the felt passes and which hold the felt in the form of a loop, one of said first set of rolls constituting a breast roll and one of said second second set of rolls constituting a slice roll which is in close proximity to said breast roll and has a solid periphery, a source of paper stock under pressure, a stock inlet connected to said source of stock and arranged to direct stock between said breast and slice rolls and onto said fabric and felt passing between the breast and slice rolls whereby the stock drains through said fabric to form a web on said fabric, an additional one of said second set of rolls constituting a pickup roll and an additional one of said first set of rolls being arranged with respect to the said breast and slice rolls so that passes of said fabric and said felt leaving said breast and slice rolls are in substantial contact to protect the formed paper web picked off said fabric by said felt beneath said pickup roll, and a pair of press rolls having a press nip between them between which said felt and the paper web carried thereby pass for substantially dewatering the formed web.

17. In a method of making a paper web, moving and supporting in looped form an endless paper web forming fabric having interstices therethrough for draining paper stock deposited thereon, moving and supporting in looped form an endless belt so that said fabric and belt have a nip or close approach to each other, and directing dilute paper stock into said nip whereby the paper stock drains through said forming fabric to form a web thereon, said endless belt being made of a fabric comprising a multitude of randomly oriented interlocked matted fibers and having no discernible interstices therethrough whereby the paper web formed on said forming fabric follows said belt as the belt leaves said fabric.

18. In a method of making a paper web, moving and supporting in looped form an endless paper web forming fabric having interstices therethrough for draining paper stock deposited thereon, moving and supporting in looped form an endless felt so that said felt and fabric have a nip or close apporach to each other, directing dilute paper stock into said nip whereby the paper stock drains through said forming fabric to form a paper web thereon which subsquently follows said felt, and subsequently pressing said felt and the paper web carried thereon for substantially dewatering the paper web.

19. In a method of making a paper web, moving and supporting in looped form an endless paper web forming fabric having interstices therethrough for draining dilute paper stock deposited thereon, moving and supporting in looped form an endless felt so that said fabric and felt have a nip and portions traveling together in such close proximity that they substantially seal dilute paper stock from passing through the nip, directing dilute paper stock with substantial pressure into said nip and at the same time substantially sealing the stock with respect to said fabric and felt so that the paper stock drains under pressure forming conditions through said fabric in an area thereof prior to said nip to form a web on said fabric which subsequently follows said felt, and subsequently pressing said felt and the paper web carried thereon for substantially dewatering the paper web.

20. In a method of making a paper web, moving and supporting in looped form an endless paper web forming fabric having interstices therethrough for draining paper stock deposited thereon, moving and supporting in looped form an endless felt so that said felt and fabric have a nip and have respective passes that lie closely adjacent to each other and travel together and that in longitudinal section are substantially in the form of arcs with said fabric being on the outside, directing paper stock into said nip and maintaining tension on said fabric about its said arc and holding said felt from collapsing from its said arc whereby the fabric applies pressure onto the stock in the said arc of said fabric and the paper stock drains through said fabric to form a paper web on said fabric which subsequently follows said felt, and subsequently pressing said felt and the paper web carried thereon for substantially dewatering the paper web.

(References on following page)

References Cited by the Examiner

UNITED STATES PATENTS

| | | | |
|---|---|---|---|
| 2,083,818 | 6/1937 | Berry | 162—358 |
| 2,356,285 | 8/1944 | Street | 162—203 |
| 2,718,824 | 9/1955 | Hornbostel | 162—344 |
| 2,784,652 | 3/1957 | Hornbostel | 162—359 |
| 2,881,668 | 4/1959 | Thomas | 162—203 |
| 2,881,677 | 4/1959 | Thomas | 162—203 |
| 2,977,277 | 3/1961 | Kelly | 162—317 |
| 3,056,719 | 10/1962 | Webster | 162—203 |

FOREIGN PATENTS

| | | |
|---|---|---|
| 554,033 | 3/1958 | Canada. |
| 316,224 | 10/1930 | Great Britain. |

DONALL H. SYLVESTER, *Primary Examiner.*

RICHARD D. NEVINS, MORRIS O. WOLK, *Examiners.*